US011082935B2

(12) United States Patent
Liu et al.

(10) Patent No.: US 11,082,935 B2
(45) Date of Patent: Aug. 3, 2021

(54) SIGNAL TRANSMISSION METHOD AND APPARATUS

(71) Applicant: HUAWEI TECHNOLOGIES CO., LTD., Guangdong (CN)

(72) Inventors: Jin Liu, Shenzhen (CN); Pu Yuan, Shanghai (CN); Jun Luo, Kista (SE)

(73) Assignee: Huawei Technologies Co., Ltd., Guangdong (CN)

( * ) Notice: Subject to any disclaimer, the term of this patent is extended or adjusted under 35 U.S.C. 154(b) by 24 days.

(21) Appl. No.: 16/580,310

(22) Filed: Sep. 24, 2019

(65) Prior Publication Data

US 2020/0022099 A1   Jan. 16, 2020

Related U.S. Application Data

(63) Continuation of application No. PCT/CN2018/080291, filed on Mar. 23, 2018.

(30) Foreign Application Priority Data

Mar. 24, 2017 (CN) .......................... 201710182587.6

(51) Int. Cl.
*H04W 56/00* (2009.01)
*H04W 72/04* (2009.01)
*H04W 72/00* (2009.01)

(52) U.S. Cl.
CPC ....... *H04W 56/001* (2013.01); *H04W 72/005* (2013.01); *H04W 72/0446* (2013.01)

(58) Field of Classification Search
CPC ... H04W 28/04; H04W 72/04; H04W 72/042; H04W 88/08; H04L 5/0007

(Continued)

(56) References Cited

U.S. PATENT DOCUMENTS 10,863,461 B2 * 12/2020 Ko ...................... H04W 56/001
2016/0066291 A1   3/2016 Awad et al.
(Continued)

FOREIGN PATENT DOCUMENTS

CN    104349464 A    2/2015
CN    105191426 A    12/2015
(Continued)

OTHER PUBLICATIONS

3GPP TSG-RAN WG1 Meeting #88, R1-1702120, Athens, Greece, Feb. 13-17, 2017, Agenda item: 8.1.1.1.2, Source: Ericsson, Title SS burst set composition and SS time index indication (Year: 2017) (Year: 2017) (Year: 2017) (Year: 2017) (Year: 2017) (Year: 2017) (Year: 2017) (Year: 2017) (Year: 2017).*

(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

The present disclosure relates to signal transmission methods and apparatus. One example method includes detecting signals in a plurality of synchronization signal blocks, where each of the plurality of synchronization signal blocks includes a first synchronization signal, a second synchronization signal, and a broadcast signal, and where at least one type of signal in each synchronization signal block and another type of signal in the same synchronization signal block are sent on non-adjacent symbols, and obtaining the signals in the plurality of synchronization signal blocks.

11 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0139712 | A1* | 5/2018 | Abedini | H04W 56/00 |
| 2018/0167946 | A1* | 6/2018 | Si | H04W 72/0486 |
| 2018/0248642 | A1* | 8/2018 | Si | H04L 5/0092 |
| 2018/0270772 | A1* | 9/2018 | Ly | H04L 5/0053 |
| 2018/0324716 | A1* | 11/2018 | Jeon | H04W 74/0833 |
| 2019/0141695 | A1* | 5/2019 | Babaei | H04W 72/048 |
| 2019/0149305 | A1* | 5/2019 | Zhou | H04B 7/0626 370/330 |
| 2019/0173628 | A1* | 6/2019 | Ko | H04L 5/00 |
| 2019/0223163 | A1* | 7/2019 | Ko | H04W 48/12 |
| 2019/0268205 | A1* | 8/2019 | Shin | H04L 27/2666 |
| 2020/0015214 | A1* | 1/2020 | Si | H04W 72/02 |
| 2020/0137701 | A1* | 4/2020 | Harada | H04L 5/0053 |

FOREIGN PATENT DOCUMENTS

| | | | |
|---|---|---|---|
| CN | 106487437 A | 3/2017 | |
| CN | 107682133 A | 2/2018 | |
| WO | 2014161106 A1 | 10/2014 | |
| WO | 2016203290 A1 | 12/2016 | |
| WO | WO 2016/203290 A1 * | 12/2016 | ............ H04W 56/00 |

OTHER PUBLICATIONS

3GPP TSG RAN WG1, Meeting#87, R1-1611268, Reno, USA, Nov. 14-18, 2016, Source ZTE, ZTE Microelectronics, Title: Consideration of SS Block design, Agenda item: 7.1.2.1. (Year: 2016) (Year: 2016) (Year: 2016) (Year: 2016) (Year: 2016) (Year: 2016) (Year: 2016) (Year: 2016) (Year: 2016).*

3GPP TSG RAN WG1 Meeting #87, R1-1611668, Reno, USA, Nov. 14-18, 2016, Agenda item: 7.1.2.4, Source: Huawei, HiSilicon, Title: Unified on-demand initial access signals transmission for connected and idle UE Mobility (Year: 2016) (Year: 2016) (Year: 2016) (Year: 2016) (Year: 2016) (Year: 2016).*

3GPP TSG RAN WG1 Meeting #88, R1-1702823, Atens, Greece Feb. 13-17, 2017, Source: NTT Docomo, Inc., Title: Discussion on SS burst set Composition and SS block index indication for NR, Agenda item: 8.1.1.1.2 (Year: 2017) (Year: 2017) (Year: 2017) (Year: 2017) (Year: 2017) (Year: 2017).*

3GPP TSG RAN WG1 NR Ad-hoc Meeting, R1-1703234, Athens, Greece, Feb. 13-17, 2017, Source: Sharp, Title: DL Synchronization Signal Structure in NR, Agenda item: 8.1.1.1.1 (Year: 2017).*

3GPP TSG RAN WG1, Meeting #88, R1-1703832, Athens, Greece, Jan. 13-17, 2017, Agenda item: 8.1.1.1.2, Title: WF on SS burst set composition and SS-block Index Indication, Source: Huawei et al., (Year: 2017).*

Huawei et al, "WF on SS burst set composition" 3GPP TSG RAN WG1 Meeting #88, R1-1703871, Athens, Greece, Jan. 13-17, 2017, 8 pages.

Huawei et al., "WF on SS burst set composition and SS-block Index and SS-block IndexIndication", 3GPP Draft; R1-1703832, Feb. 16, 2017, 8 pages.

Ericsson "SS burst set composition and SS time index indication", 3GPP Draft; R1-1702120, XP051209280, Feb. 12, 2017, 4 pages.

3GPP TR 38.802 V2.0.0 (Mar. 2017), 3rd Generation Partnership Project, Technical Specification Group Radio Access Network, Study on New Radio (NR) Access Technology, Physical Layer Aspects(Release 14), 134 pages.

Huawei et al, "Unified on-demand initial access signals transmission for connected and idle UE Mobility" 3GPP TSG RAN WG1 Meeting #87, R1-1611668, Reno, USA, Nov. 14-18, 2016, 6 pages.

Zte et al: "Considerations on SS block design",3GPP Draft; R1-1611268,5 Nov. 2016, 8 pages.

Sharp, "DL synchronization signal structure in NR",3GPP Draft;R1-1703234,XP051210366, Feb. 13-17, 2017, 4 pages.

NTT Docomo Inc., "Discussion on SS burst set composition and SS block index indication for NR" 3GPP TSG RAN WG1 Meeting #88, R1-1702823, Athens, Greece, Feb. 13-17, 2017,6 pages.

Office Action issued in Chinese Application No. 201710182587.6 dated Nov. 4, 2019, 25 pages (With English Translation).

Extended European Search Report issued in European Application No. 18772373.9 dated Apr. 14, 2020, 15 pages.

Communication Pursuant to Rule 164 (1) EPC in European Application No. 18772373.9 dated Jan. 27, 2020, 14 pages.

PCT International Search Report and Written Opinion in International Application No. PCT/CN2018/080,291, dated Jun. 19, 2018, 20 pages (With English Translation).

* cited by examiner

SIGNAL TRANSMISSION METHOD AND APPARATUS

CROSS-REFERENCE TO RELATED APPLICATIONS

This application is a continuation of International Application No. PCT/CN2018/080291, filed on Mar. 23, 2018, which claims priority to Chinese Patent Application No. 201710182587.6, filed on Mar. 24, 2017. The disclosures of the aforementioned applications are hereby incorporated by reference in their entireties.

TECHNICAL FIELD

This application relates to the communications field, and more specifically, to a signal transmission method and apparatus.

BACKGROUND

In a study item (SI) of a 5G new radio access (NR) system, it is proposed that an NR-primary synchronization signal (NR-PSS), an NR-secondary synchronization signal (NR-SSS), and an NR-Physical Broadcast Channel (NR-PBCH) are sent within one synchronization signal block (SS block). In a single-beam case and a multi-beam case, the NR-PSS, the NR-SSS and the NR-PBCH are all sent on adjacent symbols in a time division multiplexing (TDM) manner. One or more SS blocks form one synchronization signal burst (SS burst), one or more SS bursts form one synchronization signal burst set (SS burst set), and the SS burst set is sent periodically.

The NR-PSS, the NR-SSS, and the NR-PBCH have different coverage capabilities and reliability. Therefore, different processing, for example, beamforming or power boosting, may need to be performed on these signals. In the foregoing solution, various types of processing are switched frequently between adjacent symbols. In addition, in the foregoing solution, searching for each type of signal takes a relatively long time. These problems all affect system performance.

Therefore, a synchronization signal transmission solution suitable for NR is urgently needed, to improve system performance.

SUMMARY

This application provides a signal transmission method and apparatus, so as to improve system performance.

According to a first aspect, a signal transmission method is provided, including:

generating a plurality of synchronization signal blocks, where each of the plurality of synchronization signal blocks includes a first synchronization signal, a second synchronization signal, and a broadcast signal; and sending signals in the plurality of synchronization signal blocks, where at least one type of signal in each synchronization signal block and another type of signal in the same synchronization signal block are sent on non-adjacent symbols.

In this embodiment of this application, when sending signals in the synchronization signal block, a network device sends the at least one type of signal and the another type of signal on the non-adjacent symbols. In other words, the at least one type of signal is separated from the another type of signal. In this way, types of signals that are sent together are reduced, and a time for searching for each type of signal is shortened; in addition, such a manner of separately sending signals helps perform different processing on two separate parts of signals. Therefore, the technical solution in this embodiment of this application can improve system performance.

In some possible implementations, the sending signals in the plurality of synchronization signal blocks includes:

sending the at least one type of signal in each synchronization signal block and the another type of signal in the same synchronization signal block in different slots.

In some possible implementations, the sending signals in the plurality of synchronization signal blocks includes:

sending a plurality of first synchronization signals and a plurality of second synchronization signals in the plurality of synchronization signal blocks alternately in a first slot, and sending a plurality of broadcast signals in the plurality of synchronization signal blocks consecutively or inconsecutively in a second slot.

PBCHs are separated from PSSs and SSSs, and are sent in a different slot. In this way, additional processing, for example, power boosting, can be performed on the PBCHs, to improve PBCH performance. In addition, compared with a manner of sending the PSSs, the SSSs, and the PBCHs together consecutively, this manner shortens a time for searching for the PSS.

In some possible implementations, one type of signals may be sent consecutively or inconsecutively in one slot, and a plurality of types of signals may be sent alternately or non-alternately in one slot.

In some possible implementations, a PSS, an SSS, and a PBCH in one synchronization signal block may be sent by using a same beam, and different synchronization signal blocks may correspond to different beams.

In some possible implementations, the sending signals in the plurality of synchronization signal blocks includes:

sending a plurality of first synchronization signals and a plurality of second synchronization signals in the plurality of synchronization signal blocks alternately in a first slot, and sending a plurality of broadcast signals in the plurality of synchronization signal blocks consecutively or inconsecutively in a second slot and a third slot.

In one synchronization signal block, a PSS and an SSS may be sent by using a wide beam, and a PBCH may be sent by using two narrow beams, to enhance a coverage capability of the PBCH.

In some possible implementations, the sending signals in the plurality of synchronization signal blocks includes:

sending a plurality of first synchronization signals in the plurality of synchronization signal blocks consecutively or inconsecutively in a first slot, and sending a plurality of second synchronization signals and a plurality of broadcast signals in the plurality of synchronization signal blocks alternately in a second slot and a third slot.

When PSSs are sent consecutively in one slot, a time for searching for a synchronization signal by a terminal device can be shortened, thereby shortening time-frequency synchronization duration and reducing an access latency of the terminal device. When SSSs and PBCHs are sent alternately, the SSSs can be used as demodulation reference signals of the PBCHs.

In some possible implementations, signals in each synchronization signal block include the first synchronization signal, the second synchronization signal, a third synchronization signal, and the broadcast signal; and the sending signals in the plurality of synchronization signal blocks includes:

sending a plurality of first synchronization signals, a plurality of second synchronization signals, and a plurality of third synchronization signals in the plurality of synchronization signal blocks alternately in a first slot, and sending a plurality of broadcast signals in the plurality of synchronization signal blocks consecutively or inconsecutively in a second slot.

In some possible implementations, signals in each synchronization signal block include the first synchronization signal, the second synchronization signal, the broadcast signal, and a system signal; and the sending signals in the plurality of synchronization signal blocks includes:

sending a plurality of first synchronization signals, a plurality of second synchronization signals, and a plurality of broadcast signals in the plurality of synchronization signal blocks alternately in a first slot, and sending a plurality of system signals in the plurality of synchronization signal blocks consecutively or inconsecutively in a second slot.

In some possible implementations, the broadcast signal may carry main system information, for example, an MIB; and another signal, that is, the system signal, is then used to transmit other system information.

In some possible implementations, signals in each synchronization signal block include the first synchronization signal, the second synchronization signal, the broadcast signal, and a control signal; and the sending signals in the plurality of synchronization signal blocks includes:

sending a plurality of first synchronization signals, a plurality of second synchronization signals, and a plurality of broadcast signals in the plurality of synchronization signal blocks alternately in a first slot, and sending a plurality of control signals in the plurality of synchronization signal blocks consecutively or inconsecutively in a second slot.

In some possible implementations, the broadcast signal may carry main system information, for example, an MIB; and another signal, that is, the control signal, is then used to transmit other system information.

According to a second aspect, a signal transmission method is provided, including:

generating a plurality of synchronization signal blocks, where each of the plurality of synchronization signal blocks includes a first synchronization signal and a second synchronization signal, and does not include any broadcast signal; and sending signals in the plurality of synchronization signal blocks.

In this embodiment of this application, the synchronization signal block does not include any broadcast signal. This reduces a quantity of signals in the synchronization signal block and shortens a time for searching for each type of signal.

In some possible implementations, the sending signals in the plurality of synchronization signal blocks includes:

sending a plurality of first synchronization signals in the plurality of synchronization signal blocks consecutively or inconsecutively in a first slot.

When the plurality of first synchronization signals in the plurality of synchronization signal blocks are sent in one slot, a time for searching for the first synchronization signal can be shortened.

In some possible implementations, the sending signals in the plurality of synchronization signal blocks includes:

sending a plurality of second synchronization signals in the plurality of synchronization signal blocks consecutively or inconsecutively in a second slot.

In some possible implementations, the sending signals in the plurality of synchronization signal blocks includes:

sending a plurality of first synchronization signals and a plurality of second synchronization signals in the plurality of synchronization signal blocks alternately in one slot.

In some possible implementations, the sending signals in the plurality of synchronization signal blocks includes:

sending a plurality of first synchronization signals in the plurality of synchronization signal blocks consecutively in a third slot, and sending a plurality of second synchronization signals in the plurality of synchronization signal blocks consecutively in the third slot.

In some possible implementations, signals in the synchronization signal block further include a third synchronization signal.

In some possible implementations, the sending signals in the plurality of synchronization signal blocks includes:

sending a plurality of first synchronization signals, a plurality of second synchronization signals, and a plurality of third synchronization signals in the plurality of synchronization signal blocks alternately in one slot.

In some possible implementations, the sending signals in the plurality of synchronization signal blocks includes:

sending, on non-adjacent symbols, at least one type of signal and another type of signal that are in each of the plurality of synchronization signal blocks.

In some possible implementations, the sending signals in the plurality of synchronization signal blocks includes:

sending, in different slots, at least one type of signal and another type of signal that are in each of the plurality of synchronization signal blocks.

In some possible implementations, the sending signals in the plurality of synchronization signal blocks includes:

sending a plurality of first synchronization signals in the plurality of synchronization signal blocks consecutively or inconsecutively in a fourth slot, and sending a plurality of second synchronization signals and a plurality of third synchronization signals in the plurality of synchronization signal blocks alternately in a fifth slot.

In some possible implementations, the sending signals in the plurality of synchronization signal blocks includes:

sending a plurality of first synchronization signals and a plurality of second synchronization signals in the plurality of synchronization signal blocks alternately in a sixth slot, and sending a plurality of third synchronization signals in the plurality of synchronization signal blocks consecutively or inconsecutively in a seventh slot.

According to a third aspect, a signal transmission method is provided, including:

detecting signals in a plurality of synchronization signal blocks, where each of the plurality of synchronization signal blocks includes a first synchronization signal, a second synchronization signal, and a broadcast signal, and at least one type of signal in each synchronization signal block and another type of signal in the same synchronization signal block are sent on non-adjacent symbols; and obtaining the signals in the plurality of synchronization signal blocks.

In this embodiment of this application, the at least one type of signal and the another type of signal in the synchronization signal block are separately sent. In this way, types of signals that are sent together are reduced, and a time for searching for each type of signal is shortened; in addition, such a manner of separately sending signals helps perform different processing on two separate parts of signals. Therefore, the technical solution in this embodiment of this application can improve system performance.

In some possible implementations, the at least one type of signal in each synchronization signal block and the another type of signal in the same synchronization signal block are sent in different slots.

In some possible implementations, a plurality of first synchronization signals and a plurality of second synchronization signals in the plurality of synchronization signal blocks are sent alternately in a first slot, and a plurality of broadcast signals in the plurality of synchronization signal blocks are sent consecutively or inconsecutively in a second slot; or a plurality of first synchronization signals and a plurality of second synchronization signals in the plurality of synchronization signal blocks are sent alternately in a first slot, and a plurality of broadcast signals in the plurality of synchronization signal blocks are sent consecutively or inconsecutively in a second slot and a third slot; or a plurality of first synchronization signals in the plurality of synchronization signal blocks are sent consecutively or inconsecutively in a first slot, and a plurality of second synchronization signals and a plurality of broadcast signals in the plurality of synchronization signal blocks are sent alternately in a second slot and a third slot.

In some possible implementations, signals in each synchronization signal block include the first synchronization signal, the second synchronization signal, a third synchronization signal, and the broadcast signal; and a plurality of first synchronization signals, a plurality of second synchronization signals, and a plurality of third synchronization signals in the plurality of synchronization signal blocks are sent alternately in a first slot, and a plurality of broadcast signals in the plurality of synchronization signal blocks are sent consecutively or inconsecutively in a second slot; or signals in each synchronization signal block include the first synchronization signal, the second synchronization signal, the broadcast signal, and a system signal; and a plurality of first synchronization signals, a plurality of second synchronization signals, and a plurality of broadcast signals in the plurality of synchronization signal blocks are sent alternately in a first slot, and a plurality of system signals in the plurality of synchronization signal blocks are sent consecutively or inconsecutively in a second slot; or signals in each synchronization signal block include the first synchronization signal, the second synchronization signal, the broadcast signal, and a control signal; and a plurality of first synchronization signals, a plurality of second synchronization signals, and a plurality of broadcast signals in the plurality of synchronization signal blocks are sent alternately in a first slot, and a plurality of control signals in the plurality of synchronization signal blocks are sent consecutively or inconsecutively in a second slot.

According to a fourth aspect, a signal transmission method is provided, including:

detecting signals in a plurality of synchronization signal blocks, where each of the plurality of synchronization signal blocks includes a first synchronization signal and a second synchronization signal, and does not include any broadcast signal; and obtaining the signals in the plurality of synchronization signal blocks.

In this embodiment of this application, the synchronization signal block does not include any broadcast signal. This reduces a quantity of signals in the synchronization signal block and shortens a time for searching for each type of signal.

In some possible implementations, a plurality of first synchronization signals in the plurality of synchronization signal blocks are sent consecutively or inconsecutively in a first slot, and/or a plurality of second synchronization signals in the plurality of synchronization signal blocks are sent consecutively or inconsecutively in a second slot.

In some possible implementations, a plurality of first synchronization signals and a plurality of second synchronization signals in the plurality of synchronization signal blocks are sent alternately in one slot; or a plurality of first synchronization signals in the plurality of synchronization signal blocks are sent consecutively in a third slot, and a plurality of second synchronization signals in the plurality of synchronization signal blocks are sent consecutively in the third slot.

In some possible implementations, signals in the synchronization signal block further include a third synchronization signal; and a plurality of first synchronization signals, a plurality of second synchronization signals, and a plurality of third synchronization signals in the plurality of synchronization signal blocks are sent alternately in one slot; or at least one type of signal and another type of signal that are in each of the plurality of synchronization signal blocks are sent on non-adjacent symbols; or at least one type of signal and another type of signal that are in each of the plurality of synchronization signal blocks are sent in different slots; or a plurality of first synchronization signals in the plurality of synchronization signal blocks are sent consecutively or inconsecutively in a fourth slot, and a plurality of second synchronization signals and a plurality of third synchronization signals in the plurality of synchronization signal blocks are sent alternately in a fifth slot; or a plurality of first synchronization signals and a plurality of second synchronization signals in the plurality of synchronization signal blocks are sent alternately in a sixth slot, and a plurality of third synchronization signals in the plurality of synchronization signal blocks are sent consecutively or inconsecutively in a seventh slot.

According to a fifth aspect, a signal transmission apparatus is provided, including a processor and a transceiver, so that the method in any one of the first aspect or the possible implementations of the first aspect can be performed.

According to a sixth aspect, a signal transmission apparatus is provided, including a processor and a transceiver, so that the method in any one of the second aspect or the possible implementations of the second aspect can be performed.

According to a seventh aspect, a signal transmission apparatus is provided, including a processor and a transceiver, so that the method in any one of the third aspect or the possible implementations of the third aspect can be performed.

According to an eighth aspect, a signal transmission apparatus is provided, including a processor and a transceiver, so that the method in any one of the fourth aspect or the possible implementations of the fourth aspect can be performed.

According to a ninth aspect, a computer storage medium is provided. The computer storage medium stores program code, and the program code may be used to instruct to perform the method in any one of the first, the second, the third, or the fourth aspect, or the possible implementations thereof.

According to a tenth aspect, a computer program product including an instruction is provided. When the instruction runs on a computer, the computer is enabled to perform the method in any one of the first, the second, the third, or the fourth aspect, or the possible implementations thereof.

DESCRIPTION OF EMBODIMENTS

The following describes technical solutions in this application with reference to accompanying drawings.

Figure 1:
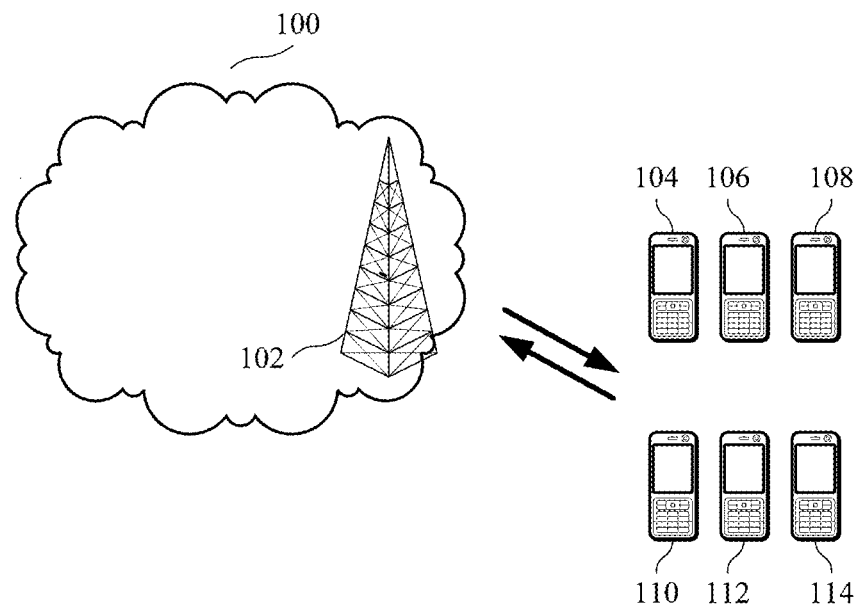
FIG. 1 is a schematic diagram of a network system to which embodiments of this application are applied.

FIG. 1 is a schematic diagram of a network system to which embodiments of this application are applied. As shown in FIG. 1, the network system 100 may include a network device 102 and terminal devices 104, 106, 108, 110, 112, and 114. The network device is wirelessly connected to the terminal devices. It should be understood that in FIG. 1, descriptions are provided by using an example in which the network system includes only one network device. However, the embodiments of this application are not limited thereto. For example, the system may alternatively include more network devices. Similarly, the system may alternatively include more terminal devices.

This specification describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN) network, or the like.

By way of example rather than limitation, in the embodiments of this application, the terminal device may be alternatively a wearable device. The wearable device may also be referred to as a wearable intelligent device, and is a general name of wearable devices that are obtained through intelligence design and development on daily wears by applying a wearable technology, such as glasses, gloves, a wristwatch, clothing, and shoes. The wearable device is a portable device that is directly worn on a human body or that is integrated into a piece of clothing or an accessory of a user. The wearable device is a hardware device, and also implements powerful functions through software support, data exchange, and cloud-based interaction. Wearable intelligent devices in a broad sense include a wearable device that has full functions and a large size and that can implement all or some of the functions independently of a smartphone, for example, a smartwatch or smart glasses; and include a wearable device that focuses only on a type of application function and that needs to be used together with another device such as a smartphone, for example, various types of smart bands and smart jewelry that are used to perform vital sign monitoring.

This specification describes the embodiments with reference to a network device. The network device may be a device configured to communicate with the terminal device. The network device may be a base transceiver station (BTS) in a global system for mobile communications (GSM) or code division multiple access (CDMA), may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the network device may be a relay station, an access point, an in-vehicle device, a wearable device, a network device in a future 5G network, a network device in a future evolved PLMN network, or the like.

In addition, in the embodiments of this application, the network device provides a service for a cell, and the terminal device communicates with the network device by using a transmission resource (for example, a frequency domain resource, that is, a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have characteristics of small coverage areas and low transmit power, and are applicable to providing a high-rate data transmission service. In addition, the cell may be alternatively a hypercell. The hypercell uses a user centric no cell radio access (UCNC) technology. To be specific, the terminal device no longer accesses a fixed physical transmission/reception point (TRP), but accesses a logical entity including a group of TRPs, to obtain a service. The logical entity may be referred to as a hypercell. A border of the hypercell is flexible, and may vary with network load and user distribution. Because all of the TRPs in the hypercell are transparent to the terminal device, the terminal device no longer connects to a fixed TRP, but only needs to access the hypercell based on a hypercell ID to obtain services from the TRPs in the hypercell.

Figure 2:
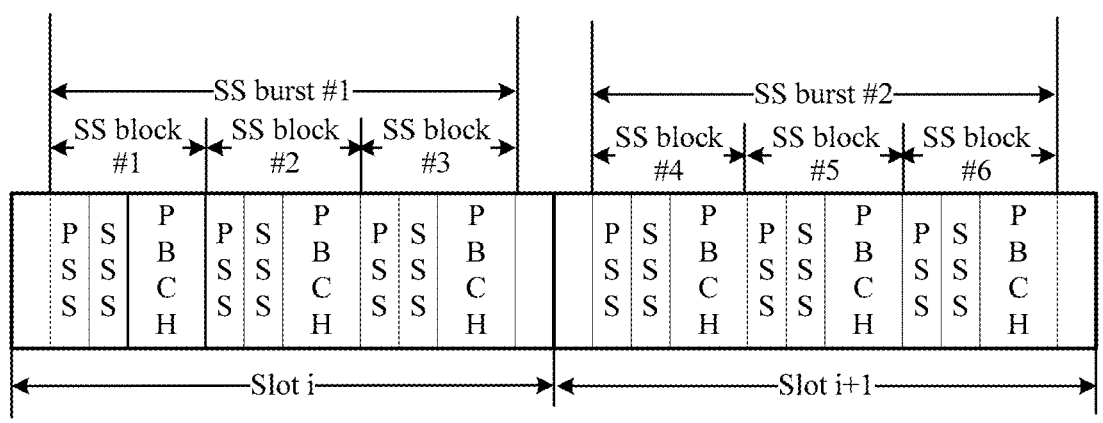
FIG. 2 is a schematic diagram of synchronization and broadcast channels.

FIG. 2 is a schematic diagram of currently purposed synchronization and broadcast channels. As shown in FIG. 2, in each SS block, an NR-PSS, an NR-SSS, and an NR-PBCH are mapped onto orthogonal frequency division multiplexing (OFDM) symbols that are consecutive in time. A plurality of consecutive SS blocks form one SS burst, and a plurality of SS bursts are sent consecutively as much as possible. Because each SS block includes consecutive OFDM symbols, the NR-PSS, the NR-SSS, and the NR-PBCH are distributed at intervals in time domain. As a result, the terminal device searches for the NR-PSS, prolonging a time for time-frequency symbol synchronization; in addition, it is inconvenient to perform different processing on different signals. This affects system performance.

The embodiments of this application provide a signal transmission solution suitable for NR, so as to improve system performance. The following details the technical solutions in the embodiments of this application.

Figure 3:
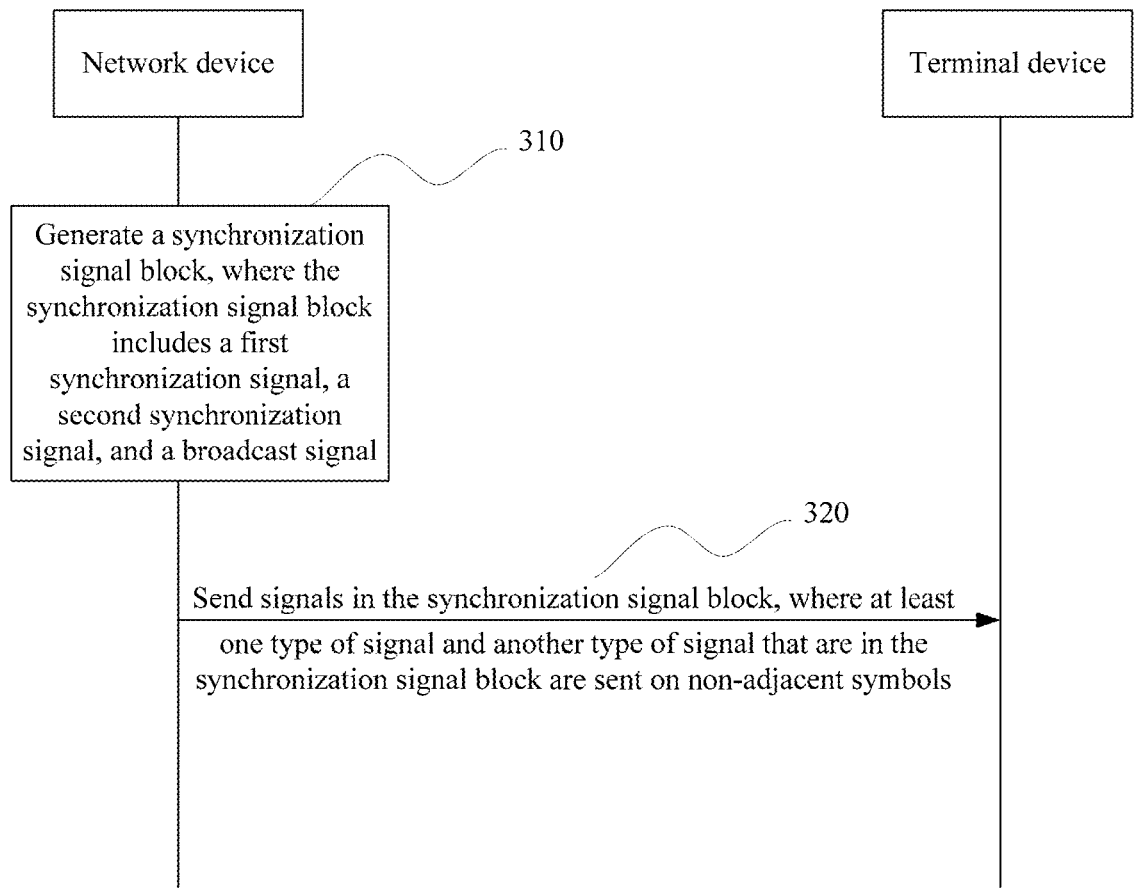
FIG. 3 is a schematic flowchart of a signal transmission method according to an embodiment of this application.

FIG. 3 is a schematic flowchart of a signal transmission method according to an embodiment of this application. In FIG. 3, a network device may be the network device 102 in FIG. 1, and a terminal device may be a terminal device 104, 106, 108, 110, 112, or 114 in FIG. 1. Certainly, in an actual system, quantities of network devices and terminal devices may not be limited to an example in this embodiment or another embodiment, and this is not repeated in the following.

310. The network device generates a plurality of synchronization signal blocks, where each of the plurality of synchronization signal blocks includes a first synchronization signal, a second synchronization signal, and a broadcast signal.

In this embodiment of this application, the first synchronization signal and the second synchronization signal are two types of synchronization signals used in a communications system. For example, the first synchronization signal may be an NR-PSS, and the second synchronization signal may be an NR-SSS. In addition, the first synchronization signal and the second synchronization signal may have functions of a current PSS and SSS, respectively. For example, the first synchronization signal may be used to determine OFDM symbol timing, frequency synchronization, slot timing, and a cell ID in a cell group; and the second synchronization signal may be used to determine frame timing, a cell group, and the like. However, this is not limited in this embodiment of this application. In other words, the first synchronization signal and the second synchronization signal may alternatively have functions different from those of the current PSS and SSS. In addition, the first synchronization signal and the second synchronization signal may use sequences that are the same as or different from those used by the current PSS and SSS, respectively. This is also not limited in this embodiment of this application.

Optionally, the first synchronization signal and the second synchronization signal may use longer sequences than those used by the current PSS and SSS. For example, the longer sequence may be a long sequence, or a sequence formed through connection of same or different sequences. These same or different sequences may have a same length or different lengths.

In various embodiments of this application, for ease of description, an example in which the first synchronization signal is a PSS and the second synchronization signal is an SSS is used for description. However, this is not limited in this embodiment of this application.

In this embodiment of this application, the broadcast signal may have a function that is the same as or different from that of a current PBCH. This is also not limited in this embodiment of this application. Optionally, the broadcast signal may carry main system information, for example, a master information block (MIB).

In this embodiment of this application, signals in the synchronization signal block may include the first synchronization signal, the second synchronization signal, and the broadcast signal. In some implementations, the signals may further include another type of signal, such as another synchronization signal (a third synchronization signal), a system signal used to transmit system information different from that transmitted in the broadcast signal, or a control signal.

The network device separately generates various types of signals in the synchronization signal block, and sends these signals by using corresponding transmission resources.

320. The network device sends signals in the plurality of synchronization signal blocks, where at least one type of signal in each synchronization signal block and another type of signal in the same synchronization signal block are sent on non-adjacent symbols.

As described above, the synchronization signal block in this embodiment of this application includes at least three types of signals. When sending the signals in the synchronization signal block, the network device sends the at least one type of signal and the another type of signal on the non-adjacent symbols. In other words, the at least one type of signal is separated from the another type of signal. In this way, types of signals that are sent together are reduced, and a time for searching for each type of signal is shortened; in addition, such a manner of separately sending signals helps perform different processing on two separate parts of signals. Therefore, the technical solution in this embodiment of this application can improve system performance.

Optionally, in an embodiment of this application, the at least one type of signal in the synchronization signal block and the another type of signal in the same synchronization signal block may be sent in different slots.

Specifically, in this embodiment, the signals in the synchronization signal block are separately sent in the different slots. To be specific, some of the signals are sent in one slot, and other signals are sent in another slot.

It should be understood that in various embodiments of this application, a symbol and a slot represent units of different granularities of a time domain resource that is used to transmit a signal. The symbol and the slot may have meanings in a current communications system, or may have meanings in a future communications system. In addition, if names of the symbol and the slot change in the future communications system, the names of the symbol and the slot may be alternatively replaced by names in the future communications system.

Optionally, in an embodiment of this application, a plurality of first synchronization signals and a plurality of second synchronization signals in the plurality of synchronization signal blocks are sent alternately in a first slot, and a plurality of broadcast signals in the plurality of synchronization signal blocks are sent consecutively or inconsecutively in a second slot.

It should be understood that a manner of sending a corresponding signal in a slot is not limited in various embodiments of this application. For example, one type of signals may be sent consecutively or inconsecutively in one slot, and a plurality of types of signals may be sent alternately or non-alternately in one slot.

Figure 4:
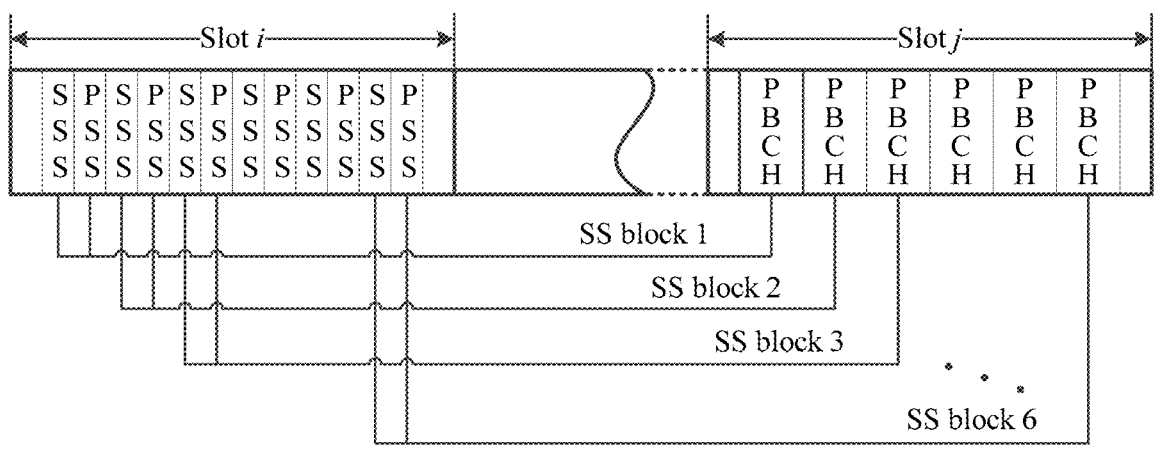
FIG. 4 to FIG. 9 are schematic diagrams of signal transmission modes according to an embodiment of this application.

For example, as shown in FIG. 4, the synchronization signal block includes a PSS, an SSS, and a PBCH; and in the plurality of synchronization signal blocks, PSSs and SSSs are sent alternately in a slot i, and PBCHs are sent consecutively in a slot j.

In FIG. 4, the PBCHs are separated from the PSSs and the SSSs, and are sent in the different slot. In this way, additional processing, for example, power boosting, can be performed on the PBCHs, to improve PBCH performance. In addition, compared with a manner of sending the PSSs, the SSSs, and the PBCHs together consecutively, this manner shortens a time for searching for the PSS.

A PSS, an SSS, and a PBCH in one synchronization signal block may be sent by using a same beam, and different synchronization signal blocks may correspond to different beams. However, this is not limited in this embodiment of this application.

It should be understood that some variations may be alternatively made to FIG. 4. For example, the PBCHs may be alternatively sent inconsecutively in the slot j, or locations of the PSSs and the SSSs may be alternatively interchanged. These variations shall also be considered as embodiments of this application. For brevity, these similar variations are not described in the following again.

Optionally, in an embodiment of this application, a plurality of first synchronization signals and a plurality of second synchronization signals in the plurality of synchronization signal blocks may be sent alternately in a first slot, and a plurality of broadcast signals in the plurality of synchronization signal blocks may be sent consecutively or inconsecutively in a second slot and a third slot.

Figure 5:
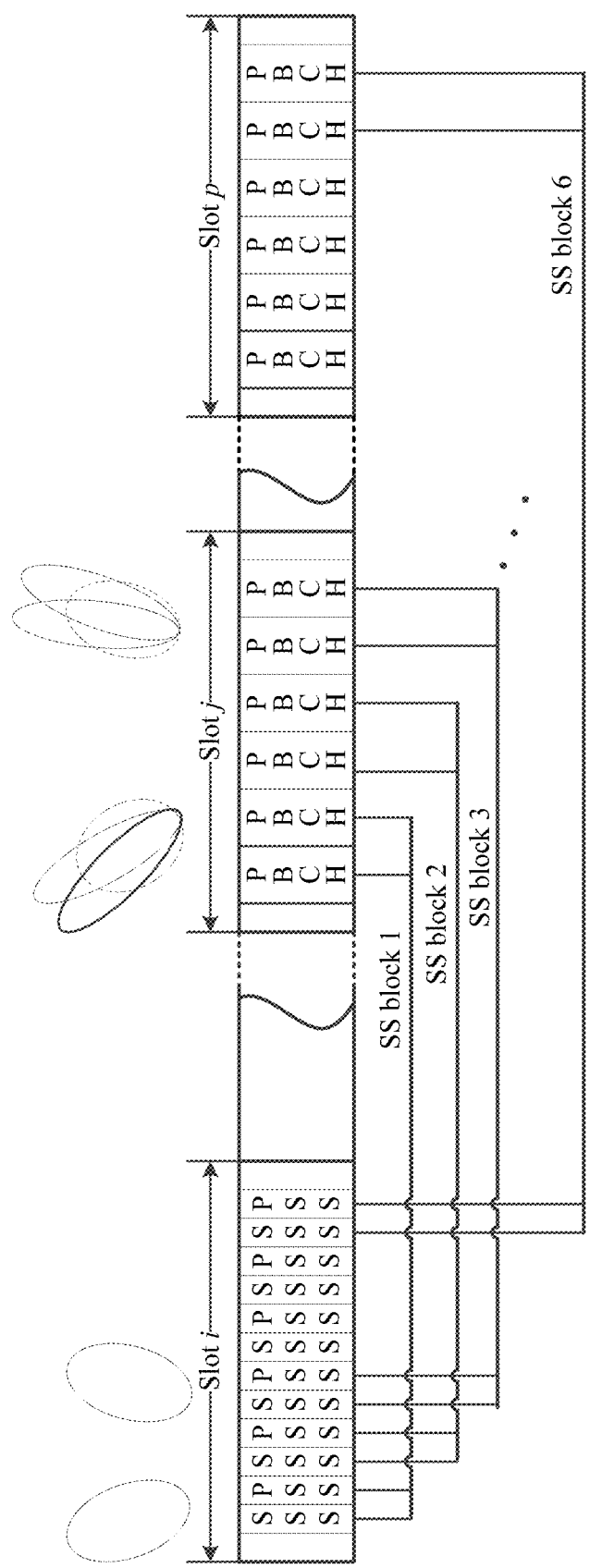

For example, as shown in FIG. 5, in the plurality of synchronization signal blocks, PSSs and SSSs are sent alternately in a slot i, and PBCHs are sent consecutively in a slot j and a slot p. In one synchronization signal block, a PSS and an SSS may be sent by using a wide beam, and a PBCH may be sent by using two narrow beams, to enhance a coverage capability of the PBCH.

Optionally, in an embodiment of this application, a plurality of first synchronization signals in the plurality of synchronization signal blocks may be sent consecutively or inconsecutively in a first slot, and a plurality of second synchronization signals and a plurality of broadcast signals in the plurality of synchronization signal blocks may be sent alternately in a second slot and a third slot.

Figure 6:
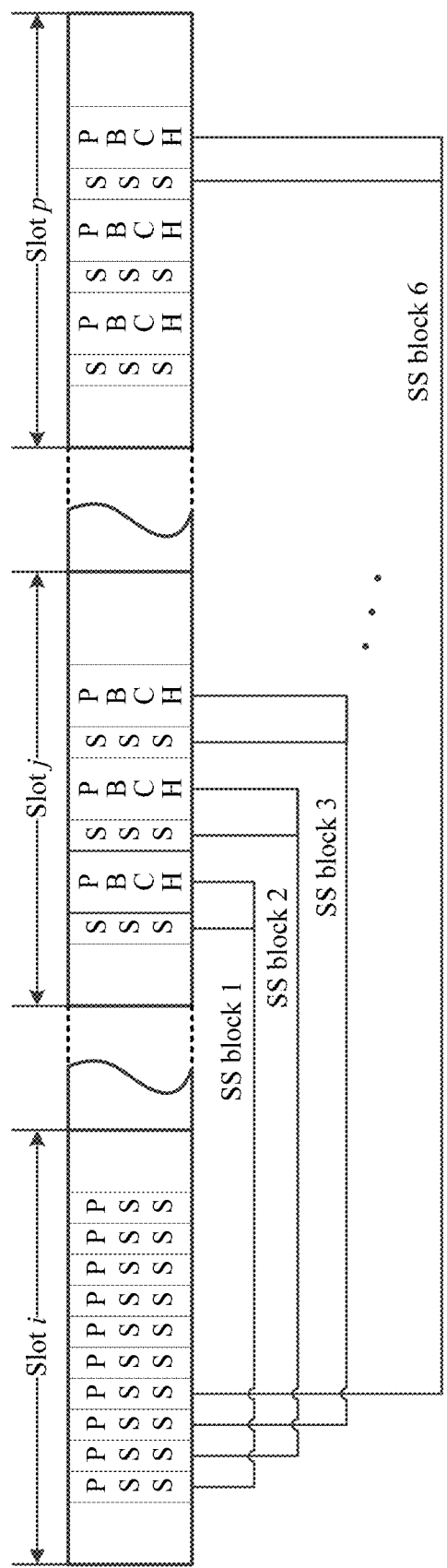

For example, as shown in FIG. 6, in the plurality of synchronization signal blocks, PSSs are sent consecutively in a slot i, and SSSs and PBCHs are sent alternately in a slot j. When the PSSs are sent consecutively in one slot, a time for searching for a synchronization signal by the terminal device can be shortened, thereby shortening time-frequency synchronization duration and reducing an access latency of the terminal device. When the SSSs and the PBCHs are sent alternately, the SSSs can be used as demodulation reference signals of the PBCHs.

In the foregoing embodiments, the synchronization signal block includes the two types of synchronization signals and the broadcast signal. Optionally, depending on a system requirement, the synchronization signal block may further include more signals. For example, the synchronization signal block may further include a third synchronization signal, a system signal, or a control signal. The following separately provides descriptions.

Optionally, in an embodiment of this application, signals in the synchronization signal block include the first synchronization signal, the second synchronization signal, a third synchronization signal, and the broadcast signal. The third synchronization signal may be an additional synchronization signal that is newly introduced depending on a system requirement. The third synchronization signal may have a function different from those of the first synchronization signal and the second synchronization signal, and may also implement synchronization and other functions together with the first synchronization signal and the second synchronization signal. For example, the third synchronization signal may be used to identify a synchronization signal block time index (SS block time index), or may be used to identify a plurality of antenna ports configured for one synchronization signal block, that is, used to identify a plurality of beams corresponding to the plurality of antenna ports. The function of the third synchronization signal is not limited in this embodiment of this application. In this case, a plurality of first synchronization signals, a plurality of second synchronization signals, and a plurality of third synchronization signals in the plurality of synchronization signal blocks may be sent alternately in a first slot, and a plurality of broadcast signals in the plurality of synchronization signal blocks may be sent consecutively or inconsecutively in a second slot.

Figure 7:
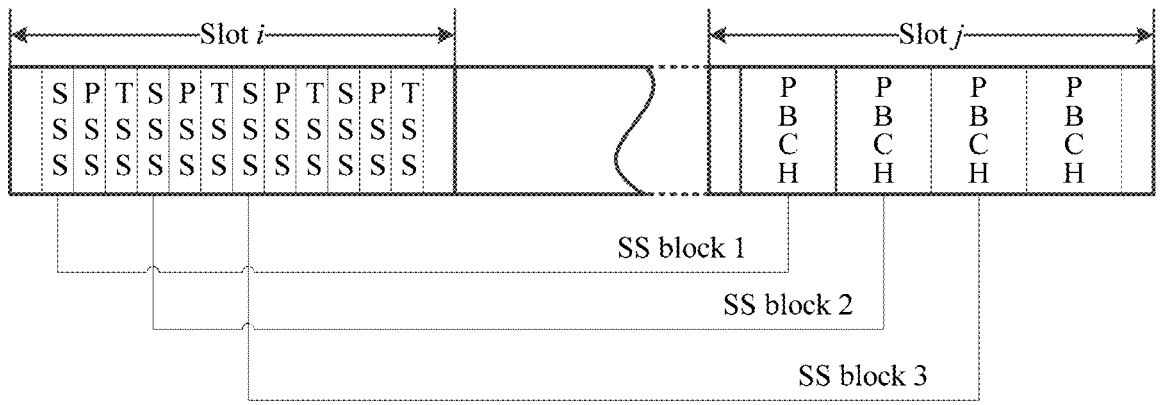

For example, as shown in FIG. 7, the synchronization signal block includes a PSS, an SSS, a TSS, and a PBCH, where the TSS represents the third synchronization signal; and in the plurality of synchronization signal blocks, PSSs, SSSs, and TSSs are sent alternately in a slot i, and PBCHs are sent consecutively in a slot j.

Similar to FIG. 4, the PBCHs are separately sent in the different slot. In this way, additional processing, for example, power boosting, can be performed on the PBCHs, to improve PBCH performance. In addition, similar to FIG. 5, the PBCH may be alternatively sent by using a plurality of narrow beams, to enhance a coverage capability of the PBCH.

Optionally, in an embodiment of this application, signals in the synchronization signal block include the first synchronization signal, the second synchronization signal, the broadcast signal, and a system signal. In this case, a plurality of first synchronization signals, a plurality of second synchronization signals, and a plurality of broadcast signals in the plurality of synchronization signal blocks may be sent alternately in a first slot, and a plurality of system signals in the plurality of synchronization signal blocks may be sent consecutively or inconsecutively in a second slot.

In this embodiment of this application, the broadcast signal may carry main system information, for example, an MIB; and another signal, that is, the system signal, is then used to transmit other system information.

Figure 8:
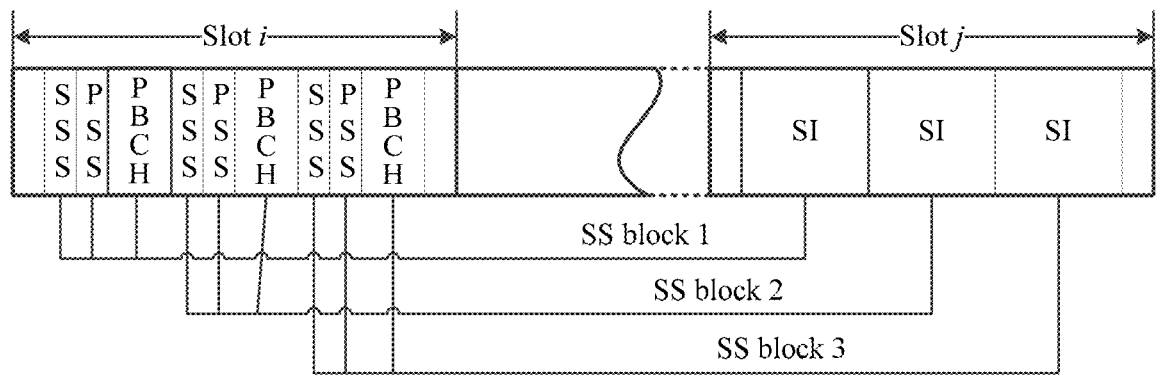

For example, as shown in FIG. 8, the synchronization signal block includes a PSS, an SSS, a PBCH, and system information (SI), where the SI represents the other system information; and in the plurality of synchronization signal blocks, PSSs, SSSs, and PBCHs are sent alternately in a slot i, and a plurality of pieces of SI are sent consecutively in a slot j. In this way, additional processing can be performed on the SI.

Optionally, in an embodiment of this application, signals in the synchronization signal block include the first synchronization signal, the second synchronization signal, the broadcast signal, and a control signal. In this case, a plurality of first synchronization signals, a plurality of second synchronization signals, and a plurality of broadcast signals in the plurality of synchronization signal blocks may be sent alternately in a first slot, and a plurality of control signals in the plurality of synchronization signal blocks may be sent consecutively or inconsecutively in a second slot.

In this embodiment of this application, the broadcast signal may carry main system information, for example, an MIB; and another signal, that is, the control signal, is then used to transmit other system information.

Figure 9:
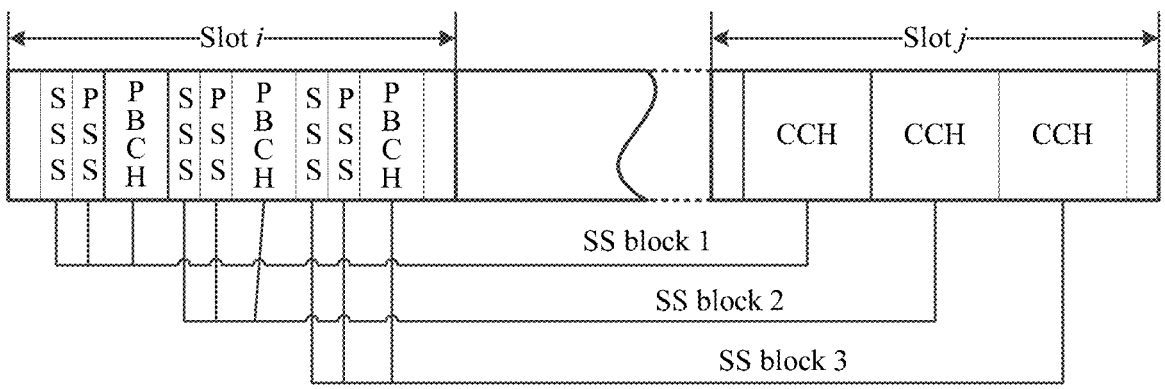

For example, as shown in FIG. 9, the synchronization signal block includes a PSS, an SSS, a PBCH, and a control channel (CCH), where the CCH represents the other system information; and in the plurality of synchronization signal blocks, PSSs, SSSs, and PBCHs are sent alternately in a slot i, and CCHs are sent consecutively in a slot j. In this way, additional processing can be performed on the CCHs.

It should be understood that a quantity of the signals in the synchronization signal block is not limited in the embodiments of this application. When the synchronization signal block includes more signals, manners of sending the more signals may be deduced by analogy based on the manner of separately sending the signals in the foregoing various embodiments. For example, one or more types of signals and another type of signal are separately sent. This shall also fall within the scope of the embodiments of this application.

For the foregoing various compositions and transmission modes of the synchronization signal blocks, the terminal device correspondingly receives the signals, that is, detects the signals in the synchronization signal block, obtains the signals in the synchronization signal block, and performs subsequent processing. Receiving by the terminal device corresponds to sending by the network device. Therefore, details are not described.

In the foregoing various embodiments, each synchronization signal block includes the broadcast signal. Therefore, the technical solutions in these embodiments may be applied to a standalone scenario. In the standalone scenario, an NR system directly accesses a core network, and does not need to be attached to another system to send an auxiliary access signal. In a non-standalone scenario, an NR system needs to be attached to another system to access a core network, and the non-standalone NR system may provide only air-interface-related transmission at least. For the non-standalone scenario, the embodiments of this application also provide a solution of transmitting signals in a synchronization signal block. The following provides detailed descriptions. It should be understood that in addition to the following descriptions, the following embodiments may further include the descriptions in the foregoing embodiments. For brevity, details are not described in the following again.

Figure 10:
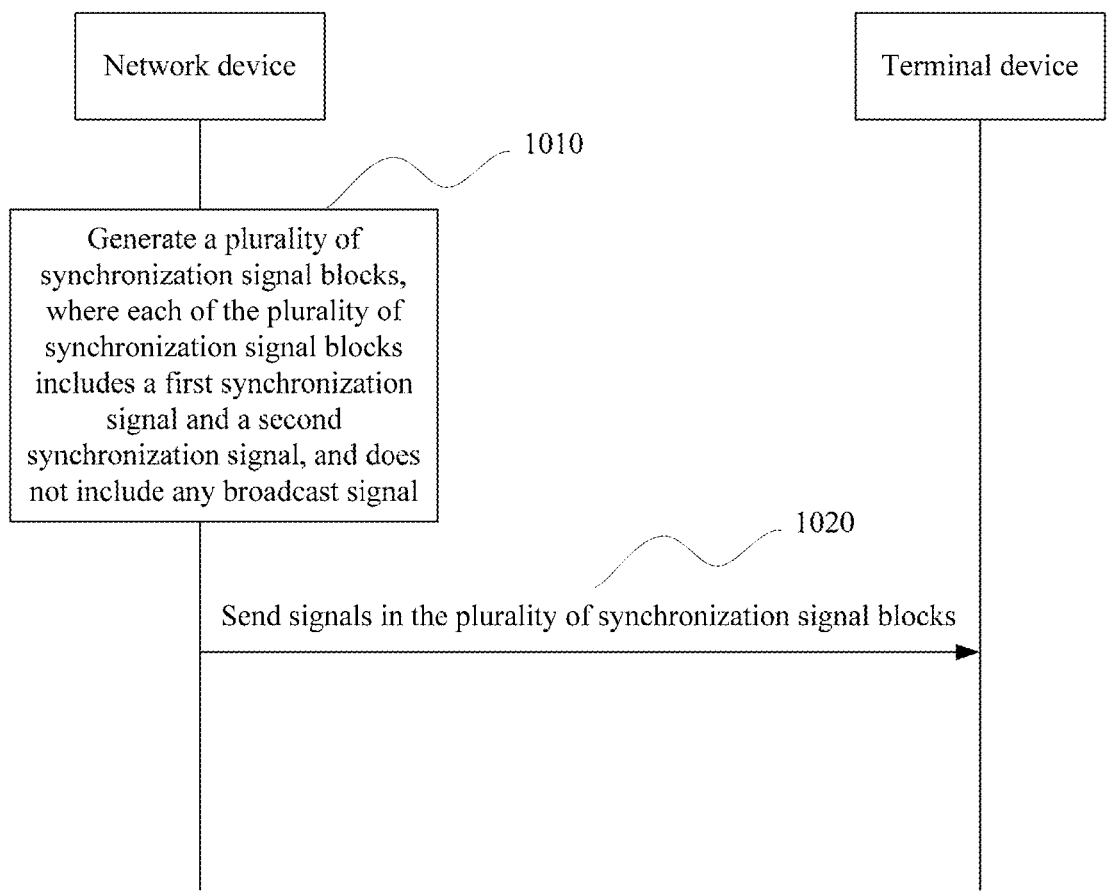
FIG. 10 is a schematic flowchart of a signal transmission method according to another embodiment of this application.

FIG. 10 is a schematic flowchart of a signal transmission method according to another embodiment of this application.

1010. A network device generates a plurality of synchronization signal blocks, where each of the plurality of synchronization signal blocks includes a first synchronization signal and a second synchronization signal, and does not include any broadcast signal.

In this embodiment of this application, the synchronization signal block does not include any broadcast signal. This reduces a quantity of signals in the synchronization signal block and shortens a time for searching for each type of signal.

Because the synchronization signal block does not include any broadcast signal, the technical solution in this embodiment of this application may be applied to a non-standalone scenario, a dual-connectivity secondary base station system, or a secondary component carrier in a carrier aggregation system. The broadcast signal may be sent from an anchored system or on a carrier, so as to reduce system overheads or carrier overheads.

1020. The network device sends signals in the plurality of synchronization signal blocks.

The network device separately generates various types of signals in the synchronization signal block, and sends these signals by using corresponding transmission resources.

Optionally, in an embodiment of this application, a plurality of first synchronization signals in the plurality of synchronization signal blocks may be sent consecutively or inconsecutively in a first slot.

When the plurality of first synchronization signals in the plurality of synchronization signal blocks are sent in one slot, a time for searching for the first synchronization signal can be shortened.

Optionally, in an embodiment of this application, a plurality of second synchronization signals in the plurality of synchronization signal blocks may be sent consecutively or inconsecutively in a second slot.

In other words, the plurality of first synchronization signals and the plurality of second synchronization signals in the plurality of synchronization signal blocks may be separately sent in two slots.

Figure 11:
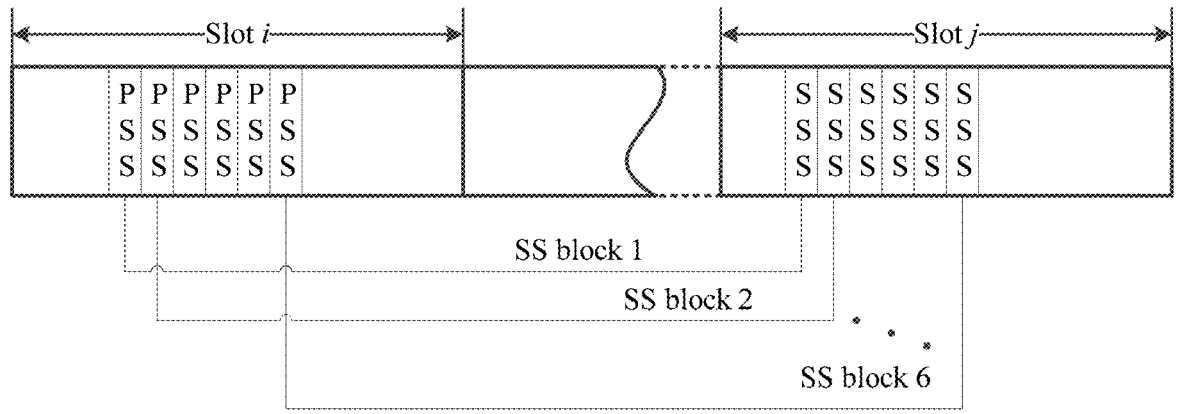
FIG. 11 to FIG. 17 are schematic diagrams of signal transmission modes according to another embodiment of this application.

For example, as shown in FIG. 11, the synchronization signal block includes a PSS and an SSS; and in the plurality of synchronization signal blocks, PSSs are sent consecutively in a slot i, and SSSs are sent consecutively in a slot j. A PSS and an SSS at locations that are corresponding to each other in the two slots belong to one synchronization signal block.

Figure 12:
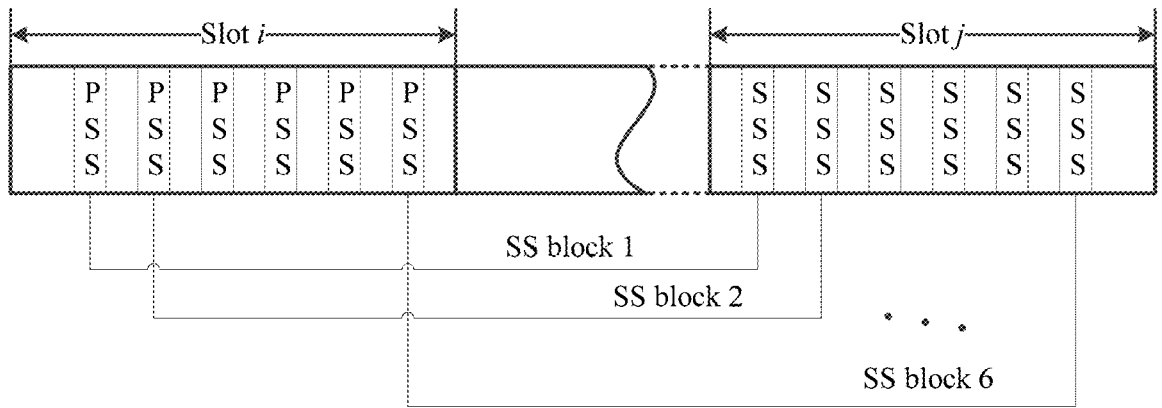

PSSs and SSSs may be alternatively sent inconsecutively in two slots. For example, as shown in FIG. 12, in the plurality of synchronization signal blocks, the PSSs are sent inconsecutively in a slot i, and the SSSs are sent inconsecutively in a slot j. A PSS and an SSS at locations that are corresponding to each other in the two slots belong to one synchronization signal block.

In FIG. 11 and FIG. 12, the PSSs and the SSSs in the synchronization signal blocks are sent in the two slots. Alternatively, the two types of synchronization signals may be sent in one slot, and there are a plurality of manners of sending the signals in one slot.

Optionally, in an embodiment of this application, a plurality of first synchronization signals and a plurality of second synchronization signals in the plurality of synchronization signal blocks may be sent alternately in one slot.

Figure 13:
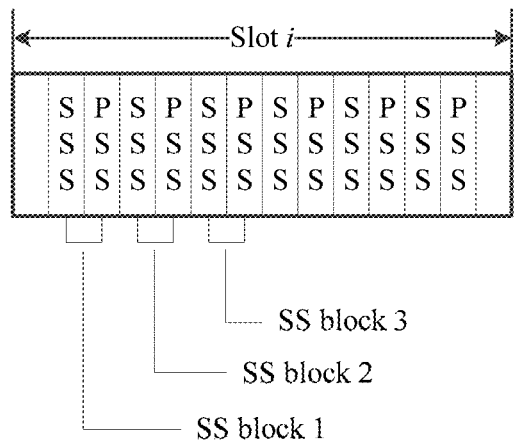

For example, as shown in FIG. 13, PSSs and SSSs in the plurality of synchronization signal blocks are sent alternately in a slot i; a PSS and an SSS that are adjacent to each other belong to one synchronization signal block.

Optionally, in an embodiment of this application, a plurality of first synchronization signals in the plurality of synchronization signal blocks may be sent consecutively in a third slot, and a plurality of second synchronization signals in the plurality of synchronization signal blocks may be sent consecutively in the third slot.

In other words, the plurality of first synchronization signals and the plurality of second synchronization signals in the plurality of synchronization signal blocks may be separately sent consecutively in one slot.

Figure 14:
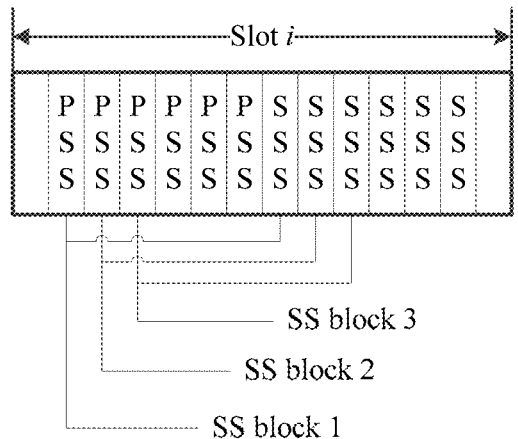

For example, as shown in FIG. 14, in the plurality of synchronization signal blocks, PSSs are sent consecutively in a slot i, and SSSs are also sent consecutively in the slot i. A PSS and an SSS at locations that are corresponding to each other belong to one synchronization signal block.

In FIG. 11 to FIG. 14, the PSSs can be sent in a relatively centralized manner. In this way, a terminal device can detect the PSS in a relatively short time, thereby shortening a time-frequency synchronization time.

In the foregoing embodiments, the synchronization signal block includes the two types of synchronization signals. Depending on a system requirement, the synchronization signal block may further include more synchronization signals. The following provides descriptions by using an example in which a third synchronization signal is included. When the synchronization signal block includes more synchronization signals, manners of sending the more synchronization signals may be deduced by analogy.

Optionally, in an embodiment of this application, a plurality of first synchronization signals, a plurality of second synchronization signals, and a plurality of third synchronization signals in the plurality of synchronization signal blocks may be sent alternately in one slot.

Figure 15:
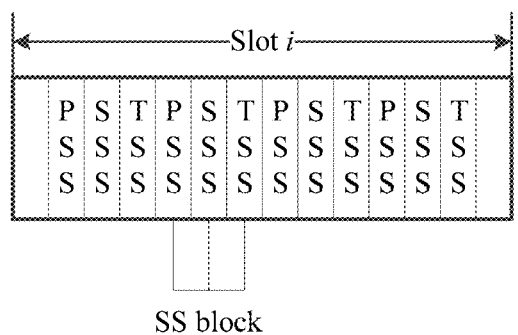

For example, as shown in FIG. 15, PSSs, SSSs, and TSSs in the plurality of synchronization signal blocks are sent alternately in a slot i; and a PSS, an SSS, and a TSS that are adjacent belong to one synchronization signal block.

Optionally, in an embodiment of this application, at least one type of signal and another type of signal that are in each of the plurality of synchronization signal blocks may be sent on non-adjacent symbols.

Specifically, this embodiment of this application may be combined with the foregoing embodiments in which the signals in the synchronization signal block are separately sent. To be specific, when the synchronization signal block includes a plurality of types of synchronization signals, at least one type of synchronization signal and another type of synchronization signal may be sent on non-adjacent symbols. In other words, the at least one type of synchronization signal is separated from the another type of synchronization signal. This can shorten a time for searching for the at least one type of synchronization signal.

Optionally, in an embodiment of this application, at least one type of signal and another type of signal that are in each of the plurality of synchronization signal blocks may be sent in different slots.

Specifically, in this embodiment, a plurality of types of synchronization signals in the synchronization signal block are separately sent in different slots. To be specific, some of the synchronization signals are sent in one slot, and other synchronization signals are sent in another slot.

Optionally, in an embodiment of this application, a plurality of first synchronization signals in the plurality of synchronization signal blocks may be sent consecutively or inconsecutively in a fourth slot, and a plurality of second synchronization signals and a plurality of third synchronization signals in the plurality of synchronization signal blocks may be sent alternately in a fifth slot.

In other words, one type of synchronization signals may be sent in one slot, and other types of synchronization signals may be sent in another slot.

Figure 16:
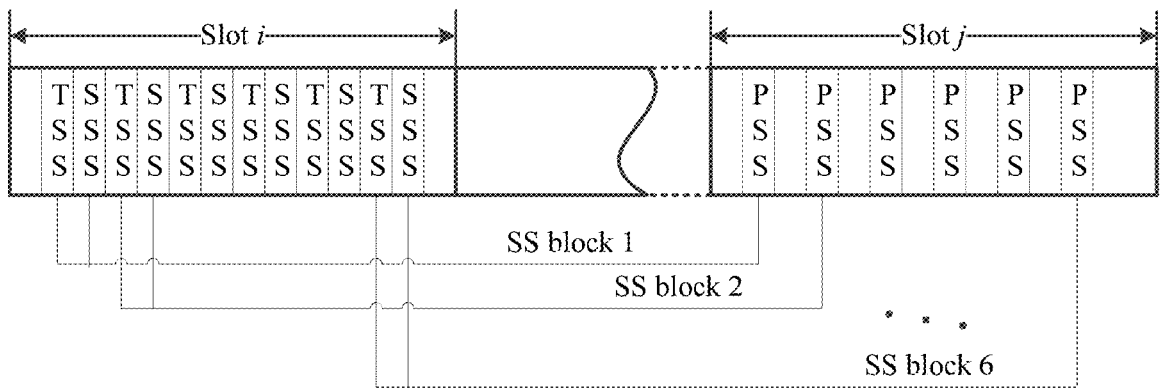

For example, as shown in FIG. 16, the synchronization signal block includes a PSS, an SSS, and a TSS; and in the plurality of synchronization signal blocks, SSSs and TSSs are sent alternately in a slot i, and PSSs are sent inconsecutively in a slot j.

In FIG. 16, the PSSs are sent in one slot separately from the other types of synchronization signals, or another type of synchronization signals may be sent in one slot separately from the other types of synchronization signals.

Optionally, in an embodiment of this application, a plurality of first synchronization signals and a plurality of second synchronization signals in the plurality of synchronization signal blocks may be sent alternately in a sixth slot, and a plurality of third synchronization signals in the plurality of synchronization signal blocks may be sent consecutively or inconsecutively in a seventh slot.

Figure 17:
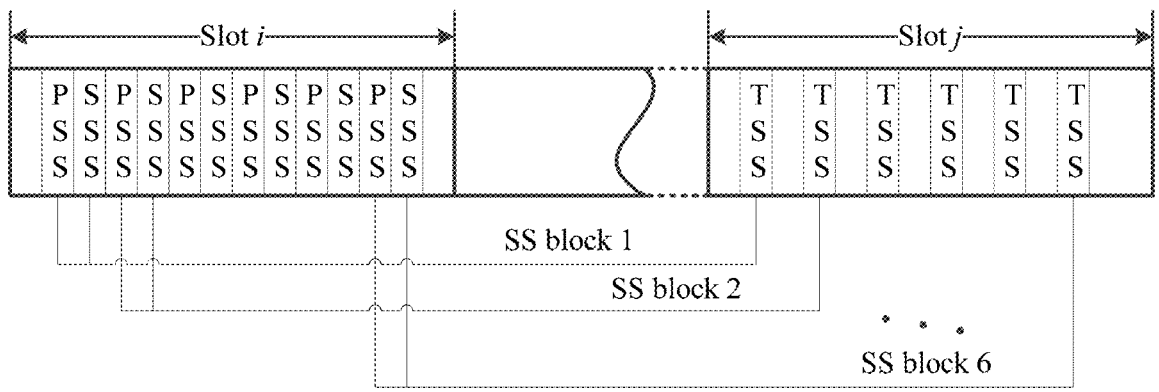

For example, as shown in FIG. 17, in the plurality of synchronization signal blocks, PSSs and SSSs are sent alternately in a slot i, and TSSs are sent inconsecutively in a slot j. The TSSs are sent in one slot separately from the other types of synchronization signals, so as to facilitate separate processing on the TSSs.

For the foregoing various compositions and transmission modes of the synchronization signal blocks, the terminal device correspondingly receives the signals, that is, detects the signals in the synchronization signal block, obtains the signals in the synchronization signal block, and performs subsequent processing. Receiving by the terminal device corresponds to sending by the network device. Therefore, details are not described.

It should be understood that the specific examples in the embodiments of this application are merely intended to help a person skilled in the art better understand the embodiments of this application, but not to limit the scope of the embodiments of this application.

It should be understood that sequence numbers of the foregoing processes do not mean execution sequences in various embodiments of this application. The execution sequences of the processes should be determined based on functions and internal logic of the processes, and the sequence numbers shall not be construed as any limitation on the implementation processes of the embodiments of this application.

The foregoing details the signal transmission methods according to the embodiments of this application, and the following describes a signal transmission apparatus according to the embodiments of this application.

Figure 18:
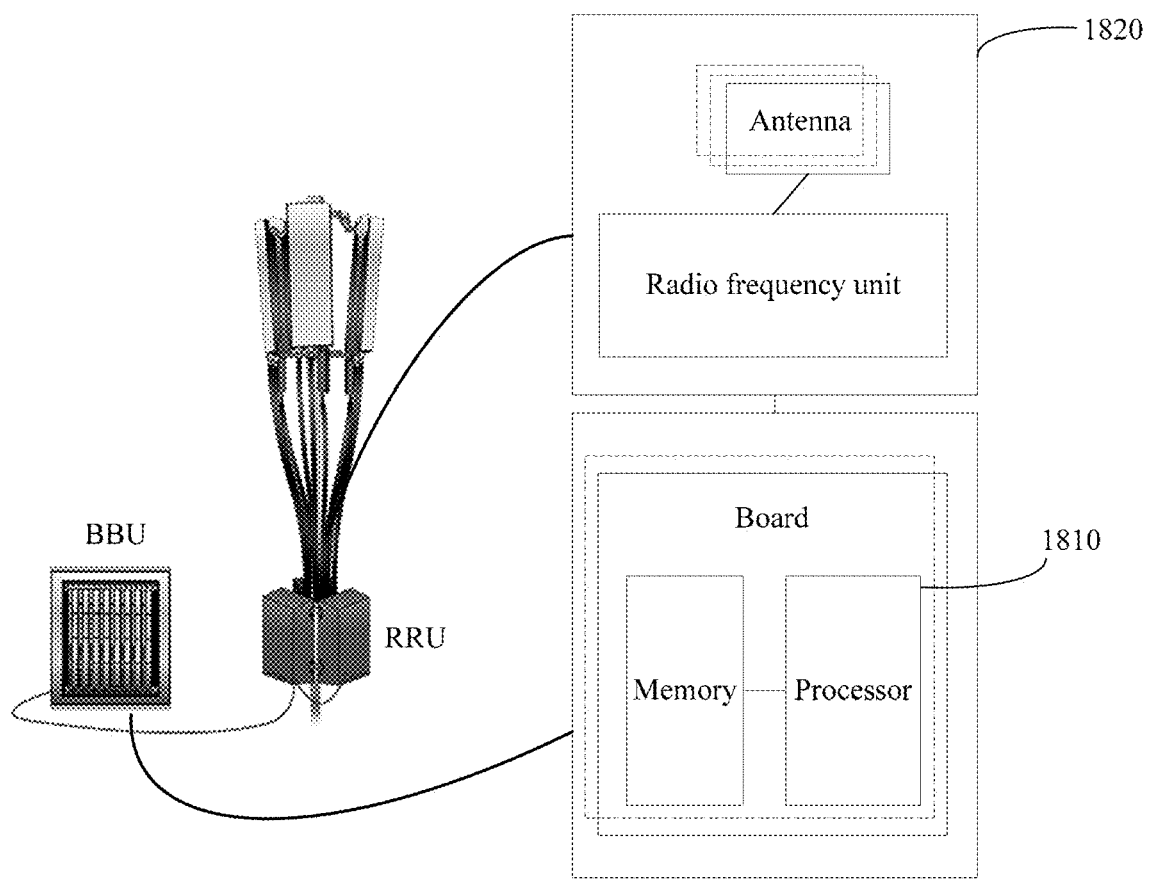
FIG. 18 is a schematic block diagram of a signal transmission apparatus according to an embodiment of this application.

FIG. 18 is a schematic diagram of a signal transmission apparatus according to an embodiment of this application. The apparatus may be a network device.

It should be understood that the apparatus may correspond to the network device in the method embodiments, and may have any function of the network device in the methods.

As shown in FIG. 18, the apparatus includes a processor 1810 and a transceiver 1820.

Optionally, the transceiver 1820 may be referred to as a remote radio unit (RRU), a transceiver unit, a transceiver, a transceiver circuit, or the like. The transceiver 1820 may include at least one antenna and a radio frequency unit, and the transceiver 1820 may be configured to: transmit and receive radio frequency signals, and perform conversion between a radio frequency signal and a baseband signal.

Optionally, the apparatus may include a baseband unit (BBU), and the baseband unit includes the processor 1810. The baseband unit may be configured to: perform baseband processing, such as channel coding, multiplexing, modulation, and spectrum spreading, and control the network device. The transceiver 1820 and the baseband unit may be physically disposed together; or may be physically disposed separately, that is, the network device is a distributed network device.

In an example, the baseband unit may include one or more boards, and a plurality of boards may jointly support a radio access network of a single access standard, or may separately support radio access networks of different access standards. The baseband unit includes the processor 1810. The processor 1810 may be configured to control the network device to perform corresponding operations in the foregoing method embodiments. Optionally, the baseband unit may further include a memory, configured to store an instruction and data that are necessary.

In an embodiment, the processor 1810 is configured to generate a plurality of synchronization signal blocks, where each of the plurality of synchronization signal blocks includes a first synchronization signal, a second synchronization signal, and a broadcast signal; and the transceiver 1820 is configured to send signals in the plurality of synchronization signal blocks, where at least one type of signal in each synchronization signal block and another type of signal in the same synchronization signal block are sent on non-adjacent symbols.

Optionally, the transceiver 1820 is configured to:

send the at least one type of signal in each synchronization signal block and the another type of signal in the same synchronization signal block in different slots.

Optionally, the transceiver 1820 is configured to:

send a plurality of first synchronization signals and a plurality of second synchronization signals in the plurality of synchronization signal blocks alternately in a first slot, and send a plurality of broadcast signals in the plurality of synchronization signal blocks consecutively or inconsecutively in a second slot.

Optionally, the transceiver 1820 is configured to:

send a plurality of first synchronization signals and a plurality of second synchronization signals in the plurality of synchronization signal blocks alternately in a first slot, and send a plurality of broadcast signals in the plurality of synchronization signal blocks consecutively or inconsecutively in a second slot and a third slot.

Optionally, the transceiver 1820 is configured to:

send a plurality of first synchronization signals in the plurality of synchronization signal blocks consecutively or inconsecutively in a first slot, and send a plurality of second synchronization signals and a plurality of broadcast signals in the plurality of synchronization signal blocks alternately in a second slot and a third slot.

Optionally, signals in each synchronization signal block include the first synchronization signal, the second synchronization signal, a third synchronization signal, and the broadcast signal; and the transceiver 1820 is configured to:

send a plurality of first synchronization signals, a plurality of second synchronization signals, and a plurality of third synchronization signals in the plurality of synchronization signal blocks alternately in a first slot, and send a plurality of broadcast signals in the plurality of synchronization signal blocks consecutively or inconsecutively in a second slot.

Optionally, signals in the synchronization signal block include the first synchronization signal, the second synchronization signal, the broadcast signal, and a system signal; and the transceiver 1820 is configured to:

send a plurality of first synchronization signals, a plurality of second synchronization signals, and a plurality of broadcast signals in the plurality of synchronization signal blocks alternately in a first slot, and send a plurality of system signals in the plurality of synchronization signal blocks consecutively or inconsecutively in a second slot.

Optionally, signals in the synchronization signal block include the first synchronization signal, the second synchronization signal, the broadcast signal, and a control signal; and the transceiver 1820 is configured to:

send a plurality of first synchronization signals, a plurality of second synchronization signals, and a plurality of broadcast signals in the plurality of synchronization signal blocks alternately in a first slot, and send a plurality of control signals in the plurality of synchronization signal blocks consecutively or inconsecutively in a second slot.

In another embodiment, the processor 1810 is configured to generate a plurality of synchronization signal blocks, where each of the plurality of synchronization signal blocks includes a first synchronization signal and a second synchronization signal, and does not include any broadcast signal; and the transceiver 1820 is configured to send signals in the plurality of synchronization signal blocks.

Optionally, the transceiver 1820 is configured to:

send a plurality of first synchronization signals in the plurality of synchronization signal blocks consecutively or inconsecutively in a first slot.

Optionally, the transceiver 1820 is configured to:

send a plurality of second synchronization signals in the plurality of synchronization signal blocks consecutively or inconsecutively in a second slot.

Optionally, the transceiver 1820 is configured to:

send a plurality of first synchronization signals and a plurality of second synchronization signals in the plurality of synchronization signal blocks alternately in one slot.

Optionally, the transceiver 1820 is configured to:

send a plurality of first synchronization signals in the plurality of synchronization signal blocks consecutively in a third slot, and send a plurality of second synchronization signals in the plurality of synchronization signal blocks consecutively in the third slot.

Optionally, signals in the synchronization signal block further include a third synchronization signal.

Optionally, the transceiver 1820 is configured to:

send a plurality of first synchronization signals, a plurality of second synchronization signals, and a plurality of third synchronization signals in the plurality of synchronization signal blocks alternately in one slot.

Optionally, the transceiver 1820 is configured to:

send, on non-adjacent symbols, at least one type of signal and another type of signal that are in each of the plurality of synchronization signal blocks.

Optionally, the transceiver 1820 is configured to:

send, in different slots, at least one type of signal and another type of signal that are in each of the plurality of synchronization signal blocks.

Optionally, the transceiver 1820 is configured to:

send a plurality of first synchronization signals in the plurality of synchronization signal blocks consecutively or inconsecutively in a fourth slot, and send a plurality of second synchronization signals and a plurality of third synchronization signals in the plurality of synchronization signal blocks alternately in a fifth slot.

Optionally, the transceiver 1820 is configured to:

send a plurality of first synchronization signals and a plurality of second synchronization signals in the plurality of synchronization signal blocks alternately in a sixth slot, and send a plurality of third synchronization signals in the plurality of synchronization signal blocks consecutively or inconsecutively in a seventh slot.

Figure 19:
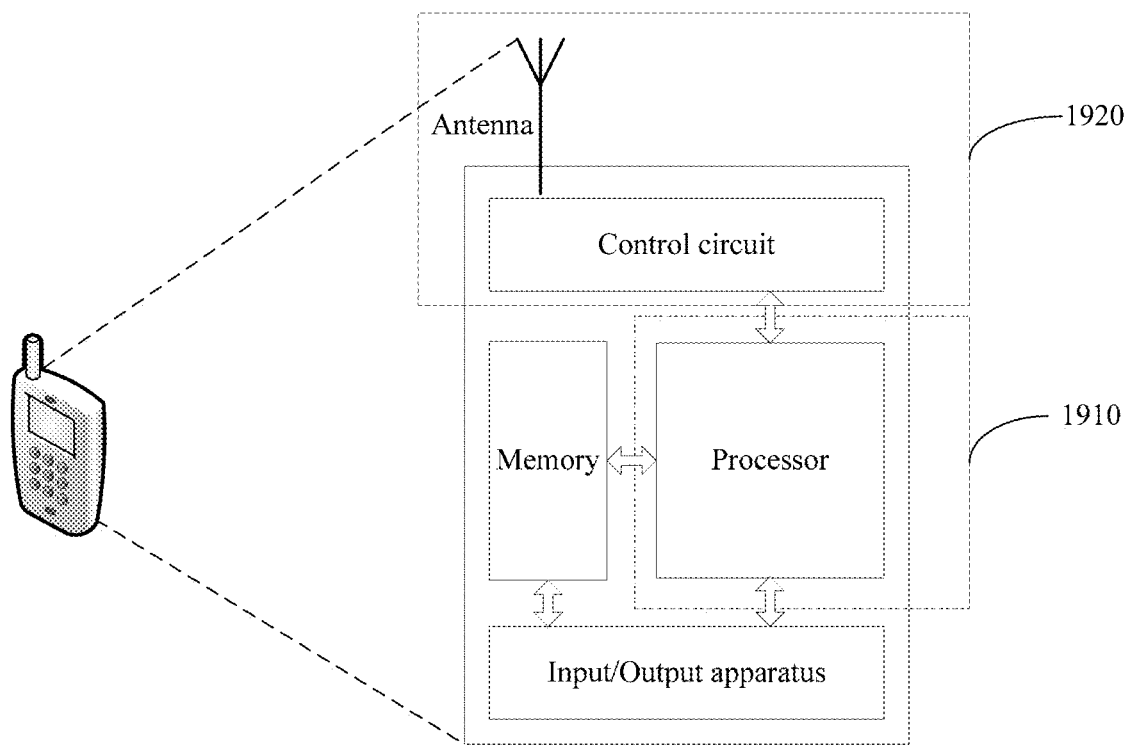
FIG. 19 is a schematic block diagram of a signal transmission apparatus according to another embodiment of this application.

FIG. 19 is a schematic diagram of a signal transmission apparatus according to another embodiment of this application. The apparatus may be a terminal device.

It should be understood that the apparatus may correspond to the terminal device in the method embodiments, and may have any function of the terminal device in the methods.

As shown in FIG. 19, the apparatus includes a processor 1910 and a transceiver 1920.

Optionally, the transceiver 1920 may include a control circuit and an antenna. The control circuit may be configured to: perform conversion between a baseband signal and a radio frequency signal, and process a radio frequency signal; and the antenna may be configured to transmit and receive radio frequency signals.

Optionally, the apparatus may further include other main components of the terminal device, such as a memory and an input/output apparatus.

The processor 1910 may be configured to: process a communications protocol and communication data, control the entire terminal device, execute a software program, and process data of the software program. For example, the processor 1910 is configured to support the terminal device in performing corresponding operations in the foregoing method embodiments. The memory is mainly configured to store the software program and data. After the terminal device is powered on, the processor 1910 may read the software program in the memory, explain and execute an instruction of the software program, and process the data of the software program.

In an embodiment, the transceiver 1920 is configured to detect signals in a plurality of synchronization signal blocks, where each of the plurality of synchronization signal blocks includes a first synchronization signal, a second synchronization signal, and a broadcast signal, and at least one type of signal in each synchronization signal block and another type of signal in the same synchronization signal block are sent on non-adjacent symbols; and the processor 1910 is configured to obtain the signals in the plurality of synchronization signal blocks.

Optionally, the at least one type of signal in each synchronization signal block and the another type of signal in the same synchronization signal block are sent in different slots.

Optionally, a plurality of first synchronization signals and a plurality of second synchronization signals in the plurality of synchronization signal blocks are sent alternately in a first slot, and a plurality of broadcast signals in the plurality of synchronization signal blocks are sent consecutively or inconsecutively in a second slot; or a plurality of first synchronization signals and a plurality of second synchronization signals in the plurality of synchronization signal blocks are sent alternately in a first slot, and a plurality of broadcast signals in the plurality of synchronization signal blocks are sent consecutively or inconsecutively in a second slot and a third slot; or a plurality of first synchronization signals in the plurality of synchronization signal blocks are sent consecutively or inconsecutively in a first slot, and a plurality of second synchronization signals and a plurality of broadcast signals in the plurality of synchronization signal blocks are sent alternately in a second slot and a third slot.

Optionally, signals in each synchronization signal block include the first synchronization signal, the second synchronization signal, a third synchronization signal, and the broadcast signal; and a plurality of first synchronization signals, a plurality of second synchronization signals, and a plurality of third synchronization signals in the plurality of synchronization signal blocks are sent alternately in a first slot, and a plurality of broadcast signals in the plurality of synchronization signal blocks are sent consecutively or inconsecutively in a second slot; or signals in each synchronization signal block include the first synchronization signal, the second synchronization signal, the broadcast signal, and a system signal; and a plurality of first synchronization signals, a plurality of second synchronization signals, and a plurality of broadcast signals in the plurality of synchronization signal blocks are sent alternately in a first slot, and a plurality of system signals in the plurality of synchronization signal blocks are sent consecutively or inconsecutively in a second slot; or signals in each synchronization signal block include the first synchronization signal, the second synchronization signal, the broadcast signal, and a control signal; and a plurality of first synchronization signals, a plurality of second synchronization signals, and a plurality of broadcast signals in the plurality of synchronization signal blocks are sent alternately in a first slot, and a plurality of control signals in the plurality of synchronization signal blocks are sent consecutively or inconsecutively in a second slot.

In another embodiment, the transceiver 1920 is configured to detect signals in a plurality of synchronization signal blocks, where each of the plurality of synchronization signal blocks includes a first synchronization signal and a second synchronization signal, and does not include any broadcast signal; and the processor 1910 is configured to obtain the signals in the plurality of synchronization signal blocks.

Optionally, a plurality of first synchronization signals in the plurality of synchronization signal blocks are sent consecutively or inconsecutively in a first slot, and/or a plurality of second synchronization signals in the plurality of synchronization signal blocks are sent consecutively or inconsecutively in a second slot.

Optionally, a plurality of first synchronization signals and a plurality of second synchronization signals in the plurality of synchronization signal blocks are sent alternately in one slot; or a plurality of first synchronization signals in the plurality of synchronization signal blocks are sent consecutively in a third slot, and a plurality of second synchronization signals in the plurality of synchronization signal blocks are sent consecutively in the third slot.

Optionally, signals in the synchronization signal block further include a third synchronization signal; and a plurality of first synchronization signals, a plurality of second synchronization signals, and a plurality of third synchronization signals in the plurality of synchronization signal blocks are sent alternately in one slot; or at least one type of signal and another type of signal that are in each of the plurality of synchronization signal blocks are sent on non-adjacent symbols; or at least one type of signal and another type of signal that are in each of the plurality of synchronization signal blocks are sent in different slots; or a plurality of first synchronization signals in the plurality of synchronization signal blocks are sent consecutively or inconsecutively in a fourth slot, and a plurality of second synchronization signals and a plurality of third synchronization signals in the plurality of synchronization signal blocks are sent alternately in a fifth slot; or a plurality of first synchronization signals and a plurality of second synchronization signals in the plurality of synchronization signal blocks are sent alternately in a sixth slot, and a plurality of third synchronization signals in the plurality of synchronization signal blocks are sent consecutively or inconsecutively in a seventh slot.

It should be understood that the processor 1810 and/or the processor 1910 in the embodiments of this application may be implemented by using a processing unit or a chip. Optionally, in an implementation process, the processing unit may include a plurality of units. The transceiver 1820 and/or the transceiver 1920 in the embodiments of this application may be implemented by using a transceiver unit or a chip. Optionally, the transceiver 1820 or the transceiver 1920 may include a transmitter or a receiver, or include a sending unit or a receiving unit.

Optionally, the network device or the terminal device may further include a memory. The memory may store program code, and the processor invokes the program code stored in the memory, to implement a corresponding function of the network device or the terminal device.

The apparatus in the implementations of this application may be a field-programmable gate array (FPGA), an application-specific integrated circuit (ASIC), a system on chip (SoC), a central processing unit (CPU), a network processor (NP), a digital signal processing circuit (DSP), a microcontroller (Micro Controller Unit, MCU), a programmable controller (Programmable Logic Device, PLD), or another integrated chip.

An embodiment of this application further provides a signal transmission apparatus, including a processing unit and a transceiver unit. The processing unit and the transceiver unit may be implemented by software or by hardware. When implemented by hardware, the processing unit may be the processor 1810 in FIG. 18, and the transceiver unit may be the transceiver 1820 in FIG. 18; or the processing unit may be the processor 1910 in FIG. 19, and the transceiver unit may be the transceiver 1920 in FIG. 19.

An embodiment of this application further provides a communications system, including the network device in the network device embodiment and the terminal device in the terminal device embodiment.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or a microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

A person of ordinary skill in the art may be aware that, units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   detecting signals in a plurality of synchronization signal blocks, wherein each of the plurality of synchronization signal blocks comprises a first synchronization signal, a second synchronization signal, and a broadcast signal, and wherein at least one type of signal in each synchronization signal block and another type of signal in the same synchronization signal block are sent on non-adjacent symbols, wherein a plurality of first synchronization signals and a plurality of second synchronization signals in the plurality of synchronization signal blocks are sent alternately in a first slot, and the first slot does not include any broadcast signal in the plurality of synchronization signal blocks; and obtaining the signals in the plurality of synchronization signal blocks.

2. The method according to claim 1, wherein the at least one type of signal in each synchronization signal block and the another type of signal in the same synchronization signal block are sent in different slots.

3. The method according to claim 1, wherein:
a plurality of broadcast signals in the plurality of synchronization signal blocks are sent consecutively or inconsecutively in a second slot; or
the plurality of broadcast signals in the plurality of synchronization signal blocks are sent consecutively or inconsecutively in the second slot and a third slot.

4. The method according to claim 1, wherein:
signals in each synchronization signal block comprise the first synchronization signal, the second synchronization signal, a third synchronization signal, and the broadcast signal, the plurality of first synchronization signals, the plurality of second synchronization signals, and a plurality of third synchronization signals in the plurality of synchronization signal blocks are sent alternately in the first slot, and a plurality of broadcast signals in the plurality of synchronization signal blocks are sent consecutively or inconsecutively in a second slot; or
signals in each synchronization signal block comprise the first synchronization signal, the second synchronization signal, the broadcast signal, and a system signal, and a plurality of system signals in the plurality of synchronization signal blocks are sent consecutively or inconsecutively in a third slot; or
signals in each synchronization signal block comprise the first synchronization signal, the second synchronization signal, the broadcast signal, and a control signal, and a plurality of control signals in the plurality of synchronization signal blocks are sent consecutively or inconsecutively in a fourth slot.

5. A signal transmission method, comprising:
detecting signals in a plurality of synchronization signal blocks, wherein each of the plurality of synchronization signal blocks comprises a first synchronization signal and a second synchronization signal, and does not comprise any broadcast signal, wherein a plurality of first synchronization signals and a plurality of second synchronization signals in the plurality of synchronization signal blocks are sent in a first slot; and
obtaining the signals in the plurality of synchronization signal blocks.

6. The method according to claim 5, wherein:
the plurality of first synchronization signals in the plurality of synchronization signal blocks are sent consecutively or inconsecutively in the first slot; or
the plurality of second synchronization signals in the plurality of synchronization signal blocks are sent consecutively or inconsecutively in the first slot; or
the plurality of first synchronization signals and the plurality of second synchronization signals in the plurality of synchronization signal blocks are sent alternately in the first slot; or
the plurality of first synchronization signals in the plurality of synchronization signal blocks are sent consecutively in the first slot, and the plurality of second synchronization signals in the plurality of synchronization signal blocks are sent consecutively in the first slot.

7. The method according to claim 5, wherein signals in each synchronization signal block further comprises a third synchronization signal, and wherein:
the plurality of first synchronization signals, the plurality of second synchronization signals, and a plurality of third synchronization signals in the plurality of synchronization signal blocks are sent alternately in the first slot.

8. A signal transmission apparatus, comprising at least one processor and a transceiver, wherein the at least one processor is coupled with one or more memories storing programming instructions for execution by the at least one processor to:
detect signals in a plurality of synchronization signal blocks, wherein each of the plurality of synchronization signal blocks comprises a first synchronization signal, a second synchronization signal, and a broadcast signal, and wherein at least one type of signal in each synchronization signal block and another type of signal in the same synchronization signal block are sent on non-adjacent symbols, wherein a plurality of first synchronization signals and a plurality of second synchronization signals in the plurality of synchronization signal blocks are sent alternately in a first slot, and the first slot does not include any broadcast signal in the plurality of synchronization signal blocks; and
obtain the signals in the plurality of synchronization signal blocks.

9. The apparatus according to claim 8, wherein the at least one type of signal in each synchronization signal block and the another type of signal in the same synchronization signal block are sent in different slots.

10. The apparatus according to claim 8, wherein:
a plurality of broadcast signals in the plurality of synchronization signal blocks are sent consecutively or inconsecutively in a second slot; or
the plurality of broadcast signals in the plurality of synchronization signal blocks are sent consecutively or inconsecutively in the second slot and a third slot.

11. The apparatus according to claim 8, wherein:
signals in each synchronization signal block comprise the first synchronization signal, the second synchronization signal, a third synchronization signal, and the broadcast signal, the plurality of first synchronization signals, the plurality of second synchronization signals, and a plurality of third synchronization signals in the plurality of synchronization signal blocks are sent alternately in the first slot, and a plurality of broadcast signals in the plurality of synchronization signal blocks are sent consecutively or inconsecutively in a second slot;
signals in each synchronization signal block comprise the first synchronization signal, the second synchronization signal, the broadcast signal, and a system signal, and a plurality of system signals in the plurality of synchronization signal blocks are sent consecutively or inconsecutively in a third slot; or
signals in each synchronization signal block comprise the first synchronization signal, the second synchronization signal, the broadcast signal, and a control signal, and a plurality of control signals in the plurality of synchronization signal blocks are sent consecutively or inconsecutively in a fourth slot.

* * * * *